(12) United States Patent
Schauer et al.

(10) Patent No.: US 11,906,542 B2
(45) Date of Patent: Feb. 20, 2024

(54) SYSTEM FOR CHECKING AN INERTIAL MEASUREMENT UNIT

(71) Applicant: Elektrobit Automotive Gmbh, Erlangen (DE)

(72) Inventors: Martin Schauer, Schwalbach a. Ts. (DE); Manuel Kraus, Schwalbach a. Ts. (DE); Lucila Patino Studencki, Schwalbach a. Ts. (DE); Christian Siller, Schwalbach a. Ts. (DE); Christian Pfeuffer, Schwalbach a. Ts. (DE); Martin Nippe, Schwalbach a. Ts. (DE); Ghazaleh Baleghkalam, Schwalbach a. Ts. (DE); Sebastian Ohl, Schwalbach a. Ts. (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 39 days.

(21) Appl. No.: 17/089,412

(22) Filed: Nov. 4, 2020

(65) Prior Publication Data
US 2021/0132108 A1     May 6, 2021

(30) Foreign Application Priority Data
Nov. 5, 2019     (EP) .................................... 19207179

(51) Int. Cl.
*G01P 21/00*     (2006.01)
*B60R 11/00*     (2006.01)
(Continued)

(52) U.S. Cl.
CPC .............. *G01P 21/00* (2013.01); *B60R 11/00* (2013.01); *G01C 19/00* (2013.01); *G01C 25/005* (2013.01);
(Continued)

(58) Field of Classification Search
CPC .. G01P 21/00; G01P 1/00; G01P 13/00; G01P 15/08; G01P 15/18; B60R 11/00; G01C 19/00; G01C 25/005
See application file for complete search history.

(56) References Cited

U.S. PATENT DOCUMENTS 4,303,978 A * 12/1981 Shaw ..................... G01C 21/16
701/506
2005/0137761 A1* 6/2005 Lungu ................... B61L 25/021
701/20

(Continued)

FOREIGN PATENT DOCUMENTS

JP     2005147696 A * 6/2005
JP     4655901 B2 * 3/2011
(Continued)

OTHER PUBLICATIONS

European Search Report issued in the corresponding EP application No. 19207179.
(Continued)

*Primary Examiner* — Natalie Huls
*Assistant Examiner* — Cynthia L Davis
(74) *Attorney, Agent, or Firm* — Cozen O'Connor

(57) ABSTRACT

A system for checking an inertial measurement unit of a vehicle, in particular a land vehicle, during driving includes the inertial measurement unit having: a first acceleration sensor configured to measure a translational acceleration along a first sensor axis and/or a first rate-of-rotation sensor configured to measure a rate of rotation about the first sensor axis and also a second acceleration sensor configured to measure a translational acceleration along a second sensor axis and/or a second rate-of-rotation sensor configured to measure a rate of rotation about the second sensor axis. A sensing device senses a movement of the vehicle in a first vehicle direction and/or about the first vehicle direction.

(Continued)

Both the first sensor axis and the second sensor axis are tilted with respect to the first vehicle direction.

8 Claims, 2 Drawing Sheets

(51) Int. Cl.
*G01C 19/00* (2013.01)
*G01C 25/00* (2006.01)
*G01P 1/00* (2006.01)
*G01P 13/00* (2006.01)
*G01P 15/08* (2006.01)
*G01P 15/18* (2013.01)

(52) U.S. Cl.
CPC ................. *G01P 1/00* (2013.01); *G01P 13/00* (2013.01); *G01P 15/08* (2013.01); *G01P 15/18* (2013.01)

(56) References Cited

U.S. PATENT DOCUMENTS

2010/0063763 A1* 3/2010 Rozelle .............. G01C 19/5691
702/92
2018/0066961 A1 3/2018 Trusov et al.

FOREIGN PATENT DOCUMENTS

JP 2015004593 A * 1/2015
WO WO-2005052601 A1 * 6/2005 .............. G01P 15/09

OTHER PUBLICATIONS

Office Action dated Jul. 13, 2022 issued in European Patent Application No. 19 207 179.3.
Office Action dated Jul. 25, 2023 issued in European Patent Application No. 19 207 179.3.

* cited by examiner

PRIOR ART

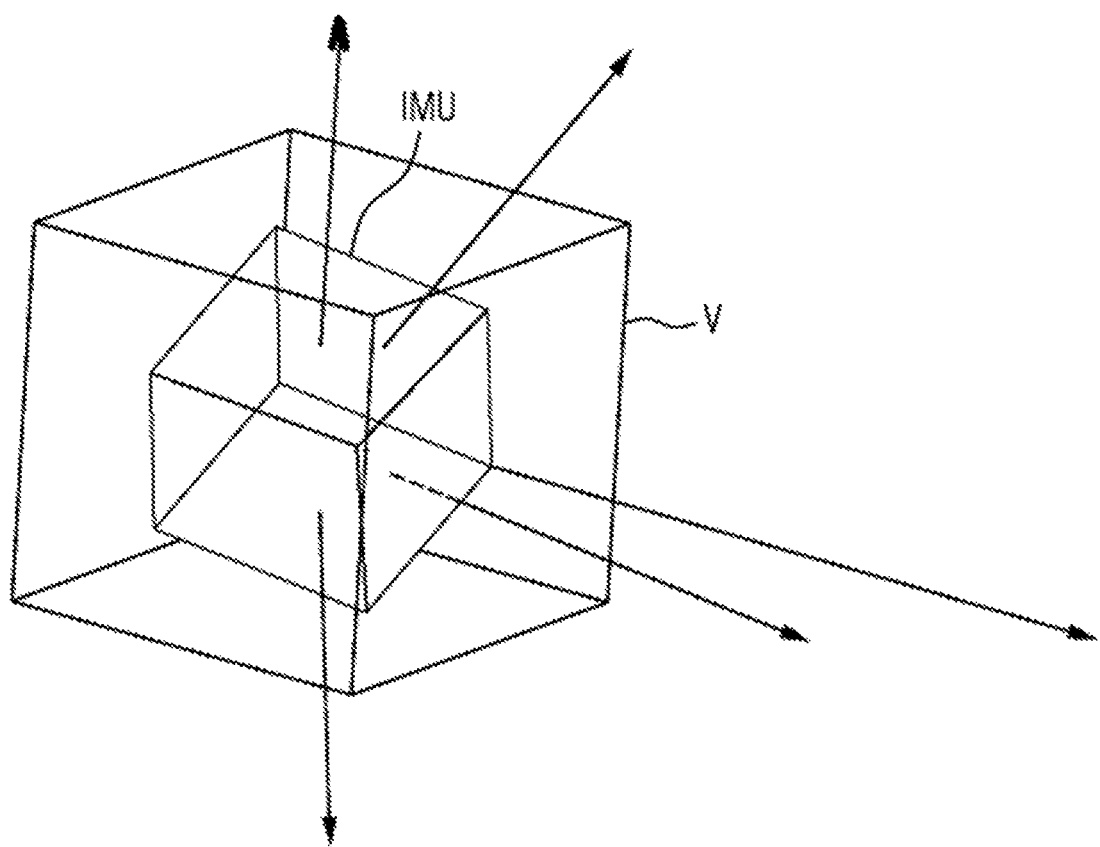

SYSTEM FOR CHECKING AN INERTIAL MEASUREMENT UNIT

BACKGROUND OF THE INVENTION

1. Field of the Invention

The invention relates to a system for checking inertial measurement of a vehicle during driving.

2. Description of the Related Art

Today, vehicles are usually equipped with satellite-aided, inertial navigation systems, the reliability and accuracy of which depend on the quality of the values determined by an inertial measurement unit (also known as an IMU). This applies in particular, but not exclusively, when there is a failure or only low availability of the signals of the satellite navigation system.

In order to be able to take part in the calculation of an accurate vehicle position, all of the sensors involved must be calibrated. Calibration in this sense means that all of the parameters must be known in order to be able to convert the measurement of the sensor into the underlying physical units. In order to achieve good accuracies, calibrating parameters must also be continually determined during operation, especially for low-cost sensors that are widely used in mass production projects.

One possibility is to use a cost-intensive inertial measurement unit, the sensors of which do not require calibration, or only once at the commencement of a journey. These have enough stability over the complete duration of the journey for continual calibration to be unnecessary. Other solutions do without a 3D position and 3D orientation estimation and are reduced to a 2D position and 1D orientation estimation. The IMU sensors necessary for this reduced set of requirements can be calibrated to an adequate extent with the dynamics typical for land vehicles. A 3D position and 3D orientation estimation however requires an inertial measurement unit that is dependent on continual or frequent calibration. This must be carried out even in the course of driving, but is scarcely possible in view of the typical driving dynamics of a land vehicle.

SUMMARY OF THE INVENTION

It is therefore, an object of the invention to provide a system of a vehicle or an inertial measurement unit or a method that makes it possible to calibrate or check the inertial measurement unit with satisfactory accuracy and reliability during driving.

The object is achieved by the features of the independent claims. Preferred developments are the subject of the dependent claims. The claims are at this point made the content of the description by express reference.

According to one aspect of the invention, a system for checking an inertial measurement unit of a vehicle, in particular a land vehicle, during driving comprises an inertial measurement unit having at least one first acceleration sensor for measuring a translational acceleration along a first sensor axis and/or a first rate-of-rotation sensor for measuring a rate of rotation about the first sensor axis. In addition, the inertial measurement unit has a second acceleration sensor for measuring a translational acceleration along a second sensor axis and/or a second rate-of-rotation sensor for measuring a rate of rotation about the second sensor axis. The rate-of-rotation sensors are also referred to as a whole as a gyroscope. A sensing device for sensing a movement of the vehicle in a first vehicle direction and/or about the first vehicle direction can deliver calibrating data for the calibration of the inertial measurement unit. The first vehicle direction is preferably the direction of propulsion or the direction of the vehicle straight ahead or back. Both the first sensor axis and the second sensor axis are tilted with respect to the first vehicle direction. Tilting is preferably understood as meaning an alignment that is not parallel or is angled.

The system specified is based on the idea that common land vehicles such as passenger cars have a propulsion system which only drives the vehicle forward or rearward, but not to the side or up or down. Similarly, turnings of the vehicle by the steered front axle only take place about the vertical vehicle axis. Active turnings about the forwardly directed axis or the lateral axis are not possible, and the underlying surface and driving maneuvers also mean that such turnings are only very small. For example, according to a conventional arrangement, the first sensor would be aligned for measurements in or counter to the driving direction of the vehicle. By contrast, the second sensor would be directed orthogonally thereto in an upward direction or aligned orthogonally in a transverse direction, therefore be scarcely exposed to the most significant directions of acceleration, which occur along the first vehicle direction, and consequently could not be reliably or accurately calibrated.

An inertial measurement unit is generally configured to measure rotations and/or accelerations in an inertial system, with accelerations in all three translational direction axes and also the respective rates of rotation about these axes often being measurable. The basic principle of acceleration measurement is usually mass inertia. Thus, for example, a seismic mass under acceleration moves toward or counter to a sensing sensor element. For the further processing or storing of the measurement data, the analog input signals are normally converted into a digital data stream. The computing steps with which the inertial measurements of the inertial measurement unit are used to determine its position and orientation are also referred to as a strapdown algorithm.

In order to be able to calibrate all three axes of gyroscopes or acceleration sensors of an inertial measurement unit, sufficient dynamics must occur along or around each axis. With commonly used methods of installation along the main vehicle axes, these dynamics only occur in few axes or directions of rotation because of the restricted freedom of movement of a land vehicle. The invention solves this problem by an inertial measurement unit of a tilted arrangement or sensor axes of a tilted arrangement. This tilting has the effect that the usually occurring dynamics of a land vehicle also have an effect on the otherwise almost uninvolved axes and allow their calibration.

According to a preferred embodiment, the inertial measurement unit has precisely one first acceleration sensor, one second acceleration sensor and also one rate-of-rotation sensor, the first and/or second acceleration sensor being tilted with respect to the first vehicle direction. The rate-of-rotation sensor is preferably not tilted and is aligned along the vertical vehicle axis.

It is preferred that the inertial measurement unit has a third acceleration sensor for measuring a translational acceleration along a third sensor axis and/or a third rate-of-rotation sensor for measuring a rate of rotation about the third sensor axis, the third sensor axis being tilted with respect to the first vehicle direction. Consequently, all three sensor axes are tilted with respect to the first vehicle direction.

It is also preferred that the sensor axes are in each case additionally tilted with respect to a second and/or third vehicle direction, the second and third vehicle directions being respectively aligned orthogonally with respect to the other vehicle directions. All of the sensor axes are correspondingly exposed to the most significant accelerations, since they usually occur in the first vehicle direction. In other words, none of the sensor axes is precisely orthogonal to these accelerations, for which reason a certain acceleration component can always be measured.

In accordance with a preferred embodiment, all of the sensor axes are respectively aligned orthogonally in relation to one another. This is practicable, since the computational complexity is kept within limits and inertial measurement units usually have sensor axes aligned in this way.

The first vehicle direction preferably corresponds to the steering-free driving direction of the vehicle, the alignment of each of the acceleration sensors of the inertial measurement unit respectively making the measurement of an acceleration component along the first vehicle direction possible. The steering-free driving direction is preferably understood here as meaning the driving direction with a steering angle of 0° or the driving direction when traveling straight ahead. It is usually the direction of the longitudinal axis of the vehicle. The greatest accelerations occur in this direction, and therefore this direction is the most relevant for the calibration.

It is preferred that each of the sensor axes is tilted by an angle of more than 10°, preferably 55°, with respect to the first vehicle direction. In particular, a tilting angle of 55° allows an evenly distributed calibratability over all of the sensors of the inertial measurement unit.

It is preferred that each of the sensor axes is tilted by the same angular amount with respect to the first vehicle direction.

The sensing device for sensing the movement of the vehicle is preferably formed as an acceleration, speed and/or displacement sensor, as an odometer, a steering angle sensor, a magnetometer, a barometer and/or a satellite navigation module. It delivers the comparative values on the basis of which the calibration is made possible.

In accordance with a further aspect of the invention, an inertial measurement unit for use in a system described here has a fastening device with a fastening plane for fastening on a vehicle, the sensor axes of the inertial measurement unit in each case being tilted by an angle with respect to the fastening plane. This allows the invention to be put into practice with the additional advantage that there is no need for any adaptation of the vehicle structure—for instance a special fastening interface that makes tilted attachment of the inertial measurement unit possible.

According to a further aspect of the invention, a method for checking an inertial measurement unit of a vehicle, in particular a land vehicle, during driving comprises that the inertial measurement unit has a first acceleration sensor for measuring a translational acceleration along a first sensor axis and/or a first rate-of-rotation sensor for measuring a rate of rotation about the first sensor axis and also a second acceleration sensor for measuring a translational acceleration along a second sensor axis and/or a second rate-of-rotation sensor for measuring a rate of rotation about the second sensor axis, the first and second sensor axes in each case being tilted with respect to a first vehicle direction, a movement of the vehicle in the first vehicle direction being sensed by a sensing device and a calibration of the inertial measurement unit being carried out on the basis of the movement sensed by the sensing device.

The method is preferably carried out by a system as described above and below.

According to a preferred embodiment, the method is repeated a number of times or in the manner of a loop during driving of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above and also the manner in which they are achieved will become clearer and more distinctly comprehensible in connection with the following description of an exemplary embodiment in conjunction with the drawings, in which, highly schematically, FIG. 2 shows an inertial measurement unit represented as a cube, installed in a way according to the invention.

DETAILED DESCRIPTION OF THE PRESENTLY PREFERRED EMBODIMENTS

Figure 1:
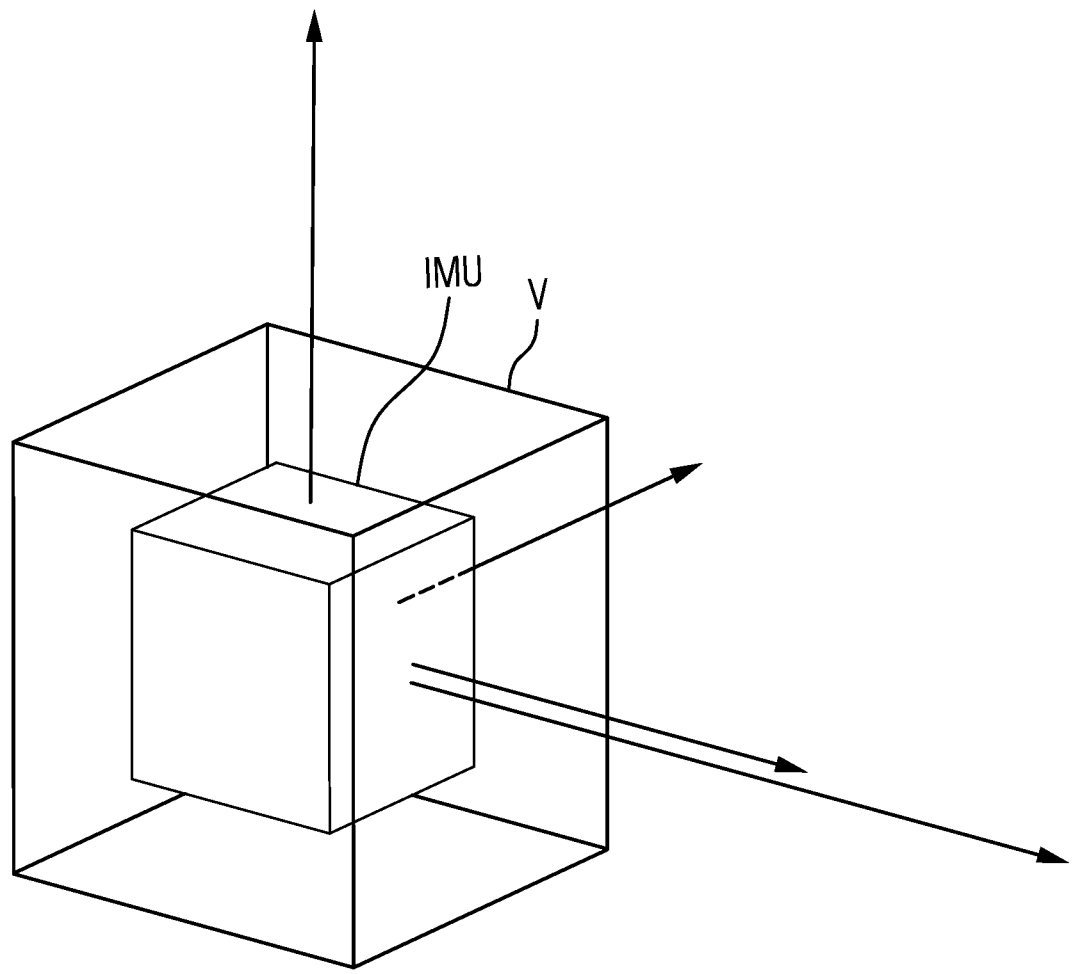
FIG. 1 shows an inertial measurement unit represented as a cube, installed in a conventional way.

The inertial measurement unit IMU is shown in FIG. 1 and FIG. 2 within the vehicle V, which for the sake of simplicity is embodied as a cube, as is the inertial measurement unit IMU. The sensor axes and also the first vehicle direction are represented as arrows.

In the case of the conventional type of installation shown in FIG. 1, according to the prior art, one of the sensor axes of the inertial measurement unit IMU is aligned coaxially in relation to the steering-free driving direction, that is to say the first vehicle direction, while the other two sensor axes are aligned orthogonally thereto. The sensor axes are therefore aligned along the main vehicle axes. This has the consequence that only the sensor axis aligned coaxially in relation to the steering-free driving direction can be calibrated well, while this is scarcely possible for the two other sensor axes, because they or a sensing device that can be used for the calibration are only exposed to very minor accelerations. For the rate-of-rotation sensor, the arrangement along the main vehicle axes has the consequence that only the axis coaxial to the vertical vehicle axis can be calibrated well, while this is scarcely possible for the two other sensor axes, because they or a sensing device that can be used for the calibration are only exposed to very minor rates of rotation.

With the alignment of the inertial measurement unit IMU according to the present invention shown in FIG. 2, on the other hand, it is made possible that all three sensor axes measure components of the acceleration along the forwardly directed axis of the vehicle V. This results in a number of modifications with respect to the commonly used type of installation along the main vehicle axes.

For the acceleration sensors, this means that the accelerations occurring as a result of the propulsion and the brakes of the vehicle V can be sensed in all of the sensor axes. This type of acceleration can be measured by a sensing device, for example in the form of further sensors, such as an odometer, or a GNSS module, providing the necessary redundancy for a calibration in all axes. Similarly, the inertial acceleration when driving around bends is also shared among all the axes. This can be calculated by the sensing device or further sensing devices, for example a differential odometer or a steering angle sensor and an odometer, and is consequently likewise available for the calibration of all the axes. Also the acceleration that is produced by the effect on the sensor of acceleration due to gravity can be sensed in all of the axes. This type of acceleration can be determined by the sensing device or further sensing devices, for example a GNSS and/or a barometer, and is consequently available for the calibration of all three axes.

For the rate-of-rotation sensors, this means that the turning of the vehicle V about its vertical axis when driving around bends acts on all three axes of the gyroscope. This turning can be determined by the sensing device or further sensing devices, for example a GNSS and/or a magnetometer, providing the necessary redundancy for a calibration in all axes. To assist, the deviation from the zero line in all three axes when stationary, which can, for example, be detected by the odometer, may optionally also be determined.

In the exemplary embodiment of FIG. 2, the sensor axes of the inertial measurement unit IMU are in each case tilted by 55° with respect to the first vehicle direction, so that the complexity of the further calculation from the signals generated is kept within limits.

The tilting of the sensor axes by 55° corresponds to the optimum tilting, of equal magnitude for all of the sensor axes, with respect to the first vehicle direction. Taking the main axes of the vehicle as a basis, this can be illustrated as rotation of an imaginary cube, which is defined by the unit vectors of the sensor axes at right angles to one another. For a first rotation at an angle of $\alpha=45°$ about the vertical axis of the vehicle, the rotation matrix is $$rot_z = \begin{pmatrix} \cos(\alpha) & \sin(\alpha) & 0 \\ -\sin(\alpha) & \cos(\alpha) & 0 \\ 0 & 0 & 1 \end{pmatrix}.$$

By a further rotation at the angle $\theta$, this time about the transversal vehicle axis with the rotation matrix $$rot_y = \begin{pmatrix} \cos(\theta) & 0 & \sin(\theta) \\ 0 & 1 & 0 \\ -\sin(\theta) & 0 & \cos(\theta) \end{pmatrix},$$

the corner of the imaginary cube lying opposite the origin, that is to say the point of intersection of the sensor axes, is transferred onto the axis of the first vehicle direction, that is to say in this example the longitudinal direction of the vehicle. The angle $\theta$ is obtained from the geometrical relations of the cube as $$\theta = \arctan\left(\frac{1}{\sqrt{2}}\right) = 35°$$

As unit vectors of the cube thus rotated, the two rotations give $$e_{x,neu} = \begin{pmatrix} 1/\sqrt{3} \\ -1/\sqrt{2} \\ -1/\sqrt{2}\sqrt{3} \end{pmatrix}, e_{y,neu} = \begin{pmatrix} 1/\sqrt{3} \\ 1/\sqrt{2} \\ -1/\sqrt{2}\sqrt{3} \end{pmatrix}, e_{z,neu} = \begin{pmatrix} 1/\sqrt{3} \\ 0 \\ \sqrt{2}/\sqrt{3} \end{pmatrix}$$

and consequently an angle of 54.7°, rounded to 55°, by which each of these unit vectors with the first vehicle direction is tilted.

A possibly more complex mathematical model for using the sensor data is to some extent compensated however by the advantage that the accuracy of the 3D position and 3D orientation estimation for land vehicles is increased by the possibility of continual calibration of all of the sensor axes.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A system for checking an inertial measurement unit (IMU) of a land vehicle (V) during driving, comprising:
    the inertial measurement unit (IMU) having precisely three sensors comprising:
    a first sensor comprising a first acceleration sensor configured to measure a translational acceleration along a first sensor axis and/or a first rate-of-rotation sensor configured to measure a rate of rotation about the first sensor axis,
    a second sensor comprising a second acceleration sensor configured to measure a translational acceleration along a second sensor axis and/or a second rate-of-rotation sensor configured to measure a rate of rotation about the second sensor axis, and
    a third rate-of-rotation sensor configured to measure a rate of rotation about a third sensor axis, the third sensor axis aligned along a vertical vehicle axis, and
    a sensing device that senses a movement of the vehicle (V) in a first vehicle direction and/or about the first vehicle direction,
    wherein both the first sensor axis and the second sensor axis are tilted with respect to the first vehicle direction wherein the first vehicle direction corresponds to a steering-free driving direction of the vehicle (V), an alignment of each of the acceleration sensors of the inertial measurement unit (IMU) respectively making the measurement of an acceleration component along the first vehicle direction possible, wherein each of the first and second sensor axes is tilted by an angle of 55°, with respect to the first vehicle direction, and wherein the first sensor axis and the second sensor axis and the third sensor axis measure components of the acceleration along the first vehicle direction, and the sensing device provides redundancy for calibration of the first sensor axis, the second sensor axis, and the third sensor axis.

2. The system as claimed in claim 1, wherein the first and second sensor axes are in each case additionally tilted with respect to a second and/or third vehicle direction, the second and third vehicle directions being respectively aligned orthogonally with respect to the other vehicle directions.

3. The system as claimed in claim 1, wherein the first and second sensor axes are respectively aligned orthogonally in relation to one another.

4. The system as claimed in claim 1, wherein the sensing device for sensing the movement of the vehicle (V) is formed as an acceleration, speed and/or displacement sensor, as one or more selected from the group of: an odometer, a steering angle sensor, a magnetometer, a barometer and a satellite navigation module.

5. An inertial measurement unit (IMU) configured for use in the system as claimed in claim 1, the internal measurement unit (IMU) comprising: a fastener with a fastening plane for fastening on the vehicle (V), wherein the first and second sensor axes of the inertial measurement unit (IMU) are in each case tilted by an angle with respect to the fastening plane.

6. A method for checking the inertial measurement unit (IMU) as claimed in claim 1, of the land vehicle N) during driving, the method comprising:

sensing a movement of the vehicle (V) by a sensing device; and calibrating the inertial measurement unit (IMU) on the basis of the movement sensed by the sensing device.

7. The method as claimed in claim 6, wherein the method is repeated a number of times, or in a loop, during driving of the vehicle (V).

8. The system as claimed in claim 1, wherein the sensing device provides continuous calibration of the first sensor axis, the second sensor axis, and the third sensor axis.

* * * * *